Sept. 22, 1970  F. E. HAWKINS ET AL  3,529,981
METHOD FOR MAKING ASBESTOS-CEMENT SHAPES
Filed Sept. 9, 1968  4 Sheets-Sheet 1

INVENTORS
Frederick E. Hawkins
Joseph L. Cangelosi
BY
ATTORNEYS

Sept. 22, 1970   F. E. HAWKINS ET AL   3,529,981
METHOD FOR MAKING ASBESTOS-CEMENT SHAPES
Filed Sept. 9, 1968   4 Sheets-Sheet 3

INVENTORS
Frederick E. Hawkins
Joseph L. Congelosi
BY
ATTORNEYS

United States Patent Office 3,529,981
Patented Sept. 22, 1970

3,529,981
METHOD FOR MAKING ASBESTOS-CEMENT SHAPES
Frederick E. Hawkins, Ambler, Pa., and Joseph L. Cangelosi, Caparra Heights, Puerto Rico, assignors to Certain-Teed Products Corporation, Ardmore, Pa., a corporation of Maryland
Continuation-in-part of application Ser. No. 511,732, Dec. 6, 1965. This application Sept. 9, 1968, Ser. No. 767,892
Int. Cl. C04b *31/08*
U.S. Cl. 106—99       7 Claims

ABSTRACT OF THE DISCLOSURE

A method for use in the extrusion of asbestos-cement shapes by means of a screw extruder, and particularly a method for preparing the mix or furnish by means of a muller. The mixing technique provides for dry mixing of the asbestos and cement in the muller, addition of the water, and then continued mulling after water addition for a very limited period of time, which results in physical characteristics of the furnish greatly facilitating screw extrusion.

---

The present application is a continuation-in-part of our prior application Ser. No. 511,732 filed Dec. 6, 1965, now abandoned.

This invention relates to the production of articles or shapes composed of asbestos-cement compositions, and is especially concerned with a method for use in making elongated shapes, such as structural pieces, boards, pipes, etc.

It has long been proposed to fabricate or form various articles from aqueous asbestos-cement mixtures by means of extrusion, but this type of operation has been subject to disadvantages and difficulties, especially when employing screw extruders. One of the problems encountered heretofore is that the power requirements for effecting screw extrusion are excessively high if the aqueous asbestos-cement mixture fed to the extruder contains only the stoichiometric quantity of water, or a quantity such that the extrusion will retain its shape prior to curing. The extrusion of a shape retaining mixture is of great advantage, since otherwise it is virtually impossible to form articles of various complex shapes, or even articles having interior hollows which would be distorted or destroyed by sagging of material which is not sufficiently stiff to retain its shape.

Thus, although power requirements for extrusion may not be excessive if excess quantities of water are employed, it is not practical to handle the relatively soft extrusion resulting from a mixture containing excessive quantities of water.

Some attempts have also been made to form articles by extruding an asbestos-cement mixture containing an excess quantity of water, and thereafter rolling or squeezing the extrusion to eliminate excess water. This procedure has the disadvantage that the cross sectional shape of the piece being made is not established by the orifice in the extruder nozzle and is therefore much more subject to variation and inaccuracy than in the case where the cross sectional shape of the extrusion is established by the size or dimensions of the extrusion orifice.

With the foregoing in mind, the invention has as its principal general objective the provision of a method for facilitating the production of asbestos-cement shapes by screw extrusion.

Among the various features of the invention which serve the above purpose are the following:

First, we have found that the manner of admixture of the ingredients prior to delivery thereof to the screw extruder is an important factor in facilitating screw extrusion. More particularly, we have found that screw extrusion requires much less power if the mixing operation is carried on in a manner to initially thoroughly admix the dry ingredients of the furnish and then add and mix in the water, but terminate the mixing action after only a very brief interval of mixing following the addition of water. The parameters and limits applicable to the mixing technique of the invention are set out more fully hereinafter.

In addition to the foregoing, the invention provides equipment especially adapted to the carrying out of the mixing technique referred to above. Thus, the invention contemplates employment of a muller crib in which one or more mulling wheels are mounted to travel, power means being provided enabling the operator to rapidly lift the mulling wheels and thereby abruptly terminate the mixing action following the addition of the water.

Still further, the invention provides certain improved techniques for the handling of the extrusion prior to curing thereof, thereby facilitating making of accurately sized extruded shapes. In connection with the handling apparatus, the invention also has in view the provision of apparatus for handling the extruded pieces arranged to provide for the separation or cutting off of definite lengths of the shape being extruded, and further arranged to handle such separated lengths, straighten them, and deliver them to a region of curing, while at the same time minimizing the time during which the extrusion operation need be interrupted. In this way the extrusion itself is facilitated, since excessively long periods of interruption have a tendency to increase the difficulty encountered in effecting the extrusion operation. By virtue of reduction in periods of interruption of the extrusion operation, the invention makes possible realization to the full of the advantages incident to ease of extrusion which results from the above referred to mixing technique which is preferably applied to the ingredients making up the furnish prior to feed of the furnish to the extrusion apparatus itself.

The arrangement of the equipment for these purposes will be fully set out hereinafter.

How the foregoing and other objects and advantages are attained will appear more fully from the following description referring to the accompanying drawings which illustrate the preferred embodiment of the equipment, various novel features of applicants' method also being described hereinafter as carried out by means of the equipment shown in the accompanying drawings.

In connection with the illustration of equipment in the drawings it is to be kept in mind that some variations and modifications may be adopted, particularly in the general relative disposition of the major components. Thus, while the drawings illustrate a mixing apparatus located closely above the extruding apparatus, it should be understood that other general arrangements could be used for instance the mixing apparatus could be located on the same level with the extruding apparatus, and appropriate transfer mechanism provided.

Figures 1A, 1B, 2:
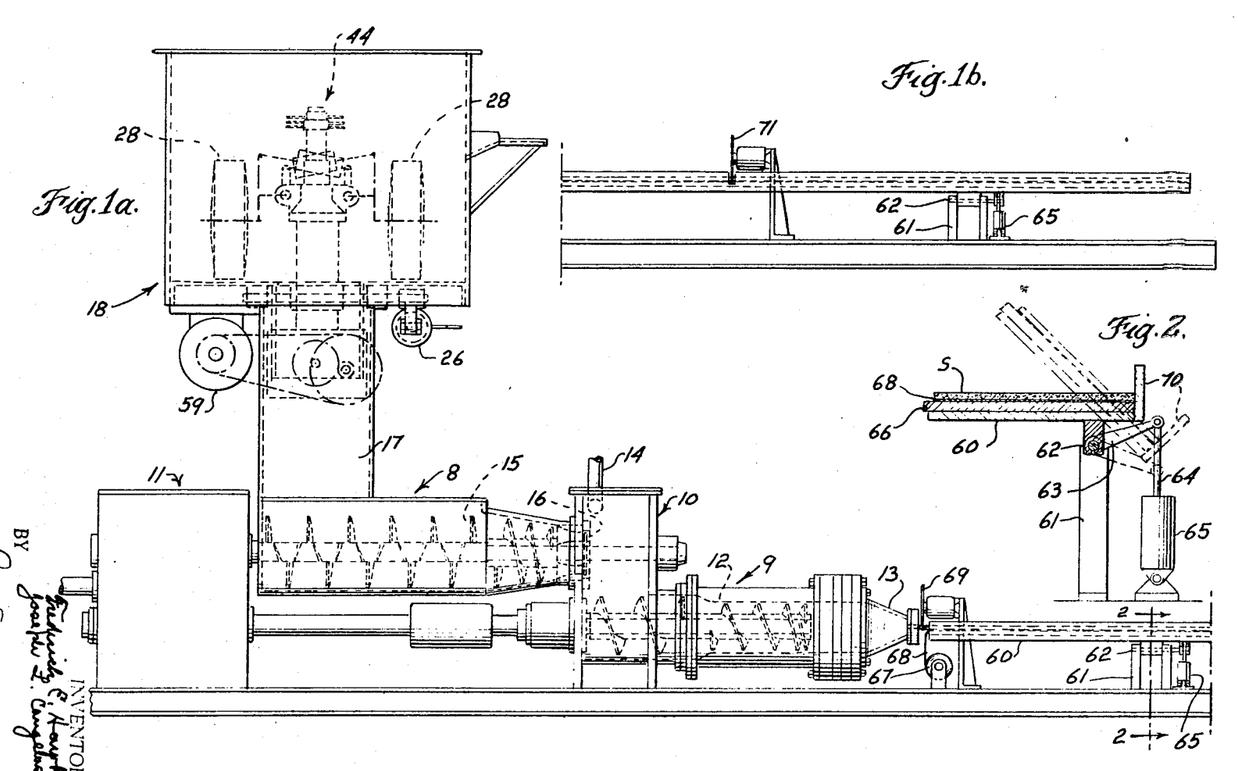
FIGS. 1*a* and 1*b*, taken together illustrate in side elevational outline the overall arrangement of the furnish mixing equipment, the extrusion equipment, and the equipment for handling the extruded pieces, all constructed and relatively arranged in accordance with the present invention.
FIG. 2 is an enlarged sectional view taken as indicated by the line 2—2 on FIG. 1, and illustrating a portion of the equipment for supporting the extruded shapes as they are delivered from the extruder.

In describing the equipment illustrated in the drawings, reference is first made to FIGS. 1a and 1b. In the lower portion of FIG. 1a there is illustrated a form of extrusion equipment suitable for employment in accordance with the present invention, this arrangement being of known type and including several components, such as the pug mill indicated generally at 8, the extruder indicated generally at 9, and an interconnecting vacuum chamber indicated at 10. The screw within the pug mill and the screw within the extruder are both adapted to be driven through the drive mechanism indicated generally at 11.

The details of the components 8, 9, 10 and 11 need not be considered herein as they form no part of the invention per se but it is mentioned that, as shown, the extruder 9 comprises a cylindrical shell in which a screw 12 is adapted to work, the screw blades being of decreasing pitch toward the delivery end (toward the right in FIG. 1a) in order to increase the compression in the region just in advance of the extrusion orifice, which is provided at the right-hand end of the nozzle indicated at 13. In the example illustrated, it is assumed that the extrusion nozzle has a rectangular orifice therein suitable for extrusion of an elongated piece or board of rectangular shape, as indicated at S in FIG. 2.

The input end of the extruder 9 receives the material to be extruded through a chamber 10 in which a vacuum is drawn, for instance by means of the vacuum connection 14, the material to be extruded being delivered into the upper portion of the vacuum chamber from the delivery end of the screw 15 disposed within the plug mill 8. The flights or turns of the screw elements of the phug screw 15 are also of decreasing pitch toward the discharge end, in order to increase the compression just in advance of the delivery of the material into the vacuum chamber 10. Suitable choppers indicated diagrammatically at 16 are arranged at the delivery end of the pug mill in order to subdivide the material as it enters the vacuum chamber, thereby facilitating release of air and gases entrapped in the asbestos-cement mixture by the action of the vacuum in the chamber 10, in a manner known per se in equipment of this sort.

The entrance end of the plug mill (toward the left of FIG. 1a) is supplied with material from the reservoir or supply chamber 17 which extends upwardly from the pug mill to the floor or bottom of the muller crib which is indicated generally in FIG. 1a by the numeral 18.

Turning now to the equipment as illustrated in FIGS. 3 to 7 inclusive, it will be seen that the muller crib is formed of a cylindrical side wall 19 and a bottom 20 in the latter of which there is provided an opening with a closure or dump gate 21 (see particularly FIGS. 5 and 6), this gate being positioned above a chute 22 serving to direct the charge of mixed asbestos-cement from the crib into the supply chamber 17, from which the material is advanced into and through the pug mill by means of the screw 15, and ultimately into and through the extruder.

The gate is pivotally mounted at 23 and, through an arm 24, is adapted to be opened and closed by an operating rod 25 connected with a piston positioned within the cylinder indicated at 26. Opening and closing movement of the gate is adapted to be effected by a fluid pressure control valve 27 associated with a pneumatic system for supplying operating fluid to one end or the other of the cylinder 26, thereby opening or closing the gate 21.

A pair of mulling wheels 28–28 are rotatively mounted on shafts 29, each of which is carried by a bracket 30 pivoted at 31 to a hub member 32 which is journaled for rotation about a vertical axis in the center of the crib, in order to provide for traveling or running of the mulling wheels 28 on the bottom 20 of the crib and thereby effect the mixing action desired. The hub 32 is supported by and driven through a shaft 33 which extends upwardly through the bottom of the crib and through the hollow nonrotative shield or post 34.

Each of the wheels 28 is adapted to be lifted by means of a fluid-pressure piston and cylinder device including the cylinder 35 which is anchored to an apertured lug 36 rigid with the hub 32. The piston (not shown) operating within the cylinder 35 has a piston rod 37 projecting from the cylinder and connected by means of the pivot 38 with an arm or bracket 39 formed as a part of the pivoted bracket 30. By this mechanism each of the mulling wheels 28 may be raised from the position shown in FIG. 3 to the position shown in FIG. 4 and may also be lowered from the position shown in FIG. 4 to the position shown in FIG. 3 and may be held in the lower position.

Figures 6, 7:
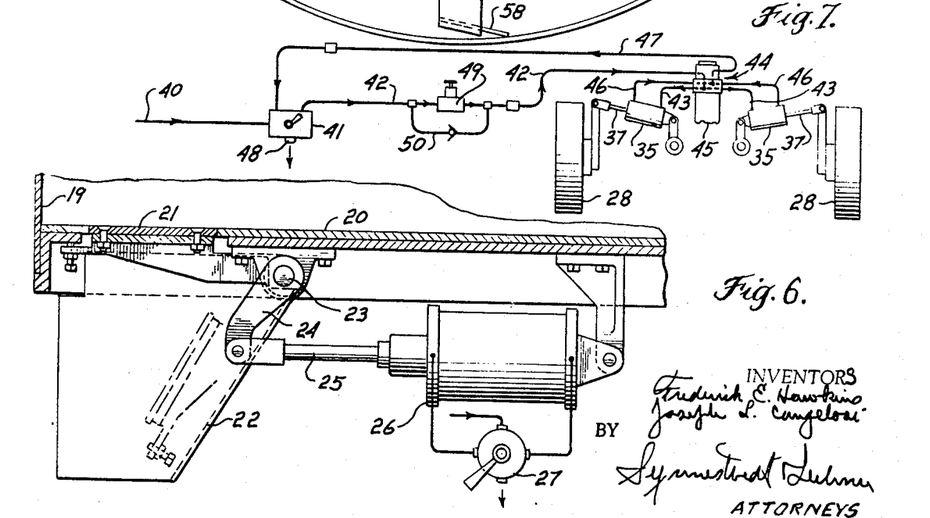
FIG. 6 is a fragmentary vertical sectional view through the floor of the crib illustrating a controllable gate for delivering the aqueous asbestos-cement mixture from the rib to the extruder.
FIG. 7 is a diagrammatic view of a control system employed in association with the equipment of FIGS. 3, 4 and 5 and providing for lifting of the mulling wheels.

A fluid-pressure control system for the purpose of raising and lowering the mulling wheels 28 is illustrated diagrammatically in FIG. 7. In that figure, a source of supply of operating fluid under pressure, for instance compressed air, is indicated at 40. By means of the valve 41, air may be supplied through the line 42 to the inner ends of the cylinders 35, by means of connections 43. A rotative union indicated generally at 44 serves to interconnect pipe 42 with the cylinder connections 43, this union being arranged at the upper end of an extension 45 projecting above the hub 32. With the valve in the position indicated in FIG. 7, the pressure from the supply line 40 enters the inner ends of the cylinders and thus forces the piston rods 37 outwardly, thereby applying a force tending to hold the mulling wheels 28 in their lower or operating position.

With the valve 41 in the position shown in FIG. 7, the outer ends of the cylinders 35 are connected with atmosphere through the cylinder connections 46 and the pipe 47, there being appropriate passages in the rotative union 44 for interconnecting the connections 46 with the pipe 47. The pipe 47 is connected through the valve 41 with atmosphere through the outlet 48.

Figure 4:
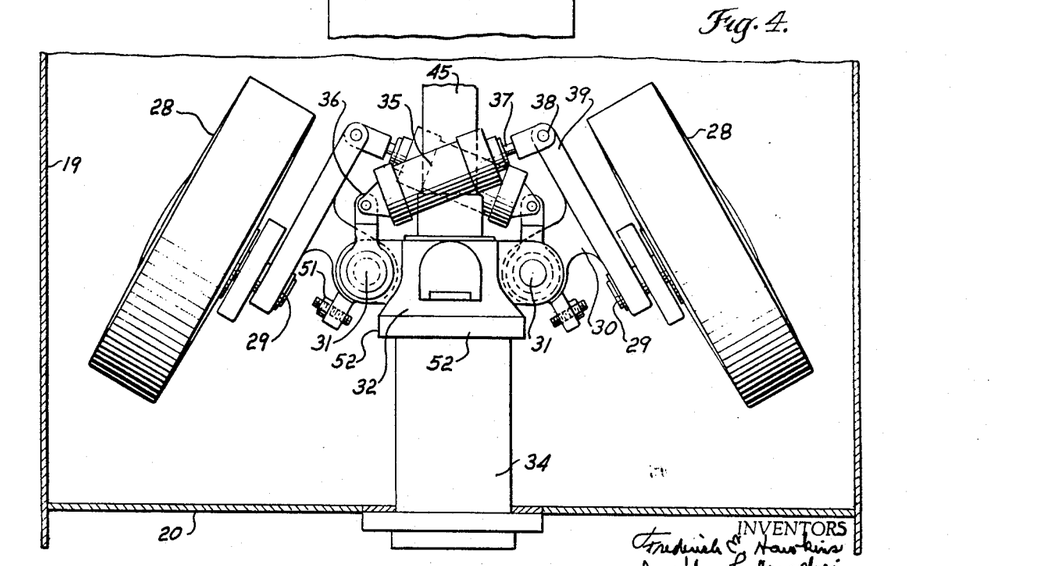
FIG. 4 is a view similar to FIG. 3 but illustrating the mulling wheels lifted from the mixing position in order to terminate the mixing operation.

When the valve 41 is adjusted to its other position, the operating air from supply line 40 flows through pipe 47 to the cylinder connections 46, thereby drawing the piston rods 37 inwardly and lifting the mulling wheels 28 as indicated in FIG. 4. At this time the inner ends of the cylinders are connected with atmosphere through the connections 43, the pipe 42, the valve 41 and the outlet 48. The valve 49 in the pipe 42 is bypassed as indicated at 50, so that when air is being exhausted through the line 42 the air passes around the valve 49. The bypass 50 is provided with a check valve preventing flow in the direction from the valve 41 toward the cylinders, but permitting flow in the reverse direction. The valve 49 is an adjustable pressure-regulating valve, and this arrangement is provided so that when the valve 41 is adjusted to the position shown in FIG. 7, thereby providing for urging the mulling wheels downwardly to their operating position, the pressure with which the wheels are urged downwardly may be adjusted by regulating the valve 49.

The lower or operating position of the mulling wheels 28 is limited by the adjustalbe screws 51, the inner ends of which are adapted to abut the stop surface 52 provided on the hub 32. These screws 51 are threaded into apertures formed in lugs which are integral with the pivotal brackets 30 in which the wheels are mounted. For the purpose of a typical mixing operating, the screws are adjusted so as to permit the wheels 28 to descend to positions approximately 1/16" from the bottom plate 20 of the crib.

Figure 3:
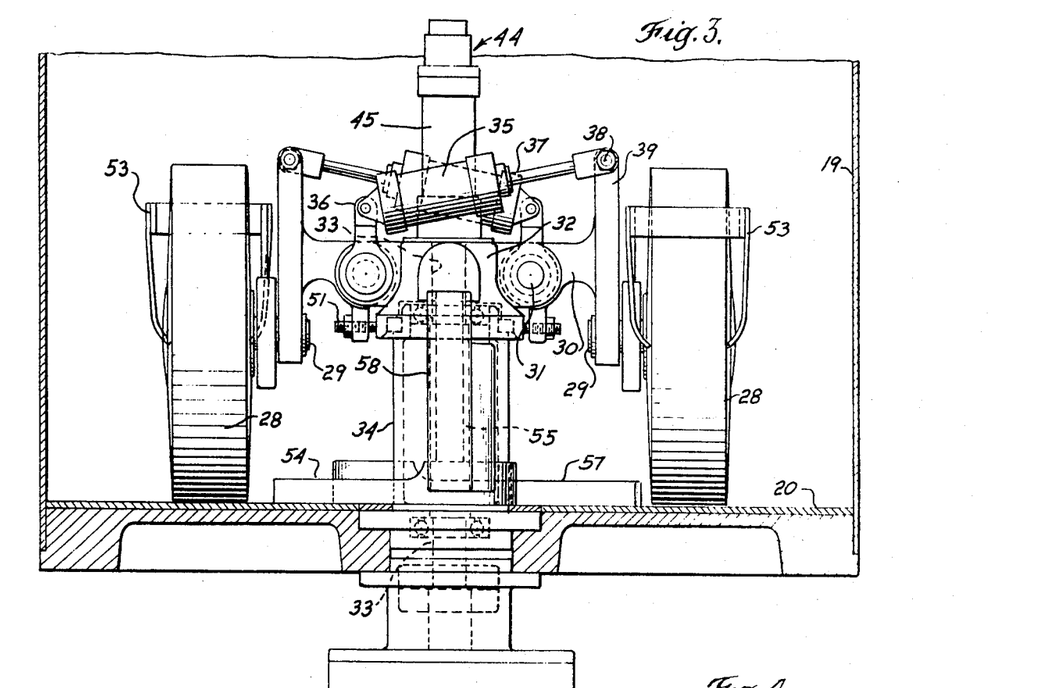
FIG. 3 is a vertical sectional view through a muller crib, with a pair of mulling wheels therein, arranged in accordance with the present invention, the mulling wheels here being shown in normal position for effecting mixing of the ingredients of the furnish.
Figure 5:
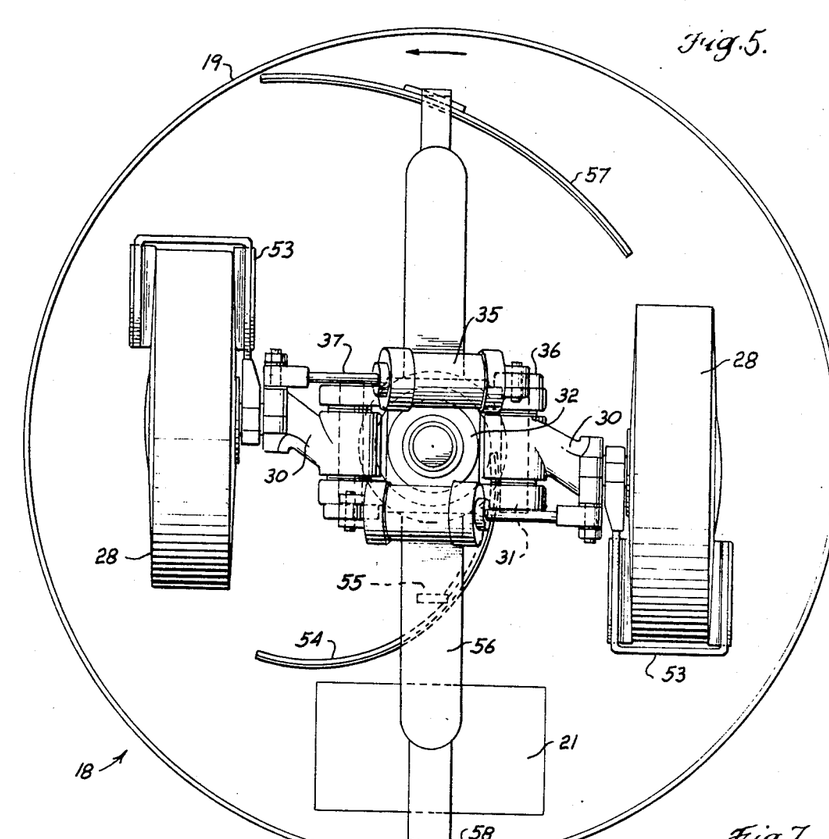
FIG. 5 is a plan view of the equipment shown in FIG. 3 and 4.

Each of the wheels 28 is provided with scraper devices such as indicated at 53 which are connected with the mounting brackets 30 and which provide for scraping of materials from the wheels as they rotate and travel around adjacent the bottom surface of the crib during the mixing operation. In addition, rotative plows or scrapers are provided for deflecting the materials being mixed from the walls of the crib into positions under the wheels 28. Thus, as seen in FIGS. 3 and 5 a curved scraper plate 54 is connected with the rotative hub 32 by means of the upright member 55 on the arm 56, this plate serving to push the materials on the bottom surface of the crib from the region close to the center post 34 radially outwardly to a position underlying the wheels as they travel in the crib, the direction of rotation being indicated by the arrow in FIG. 5. A curved scraper plate 57 also mounted to rotate with the hub 32 lies close to the bottom of the crib and serves to deflect the materials on the bottom wall from the region adjacent the cylindrical wall 19 of the crib inwardly into position underlying the wheels 28. The rotative scraper blade 58 may be employed to scrape materials from the inner surface of the cylindrical wall 19.

The drive of the central vertical shaft 33 in the crib, to effect traveling of the mulling wheels adjacent the bottom surface of the crib may be effected by any suitable drive mechanism preferably arranged below the floor of the crib for instance the drive mechanism indicated diagrammatically in FIG. 1a. A motor 59 is there shown and this motor may be connected with the drive shaft through any suitable mechanism, the details of which need not be considered as they form no part of the invention per se.

As above mentioned, in the embodiment illustrated the discharge or nozzle device 13 of the extruder is provided with a rectangular discharge orifice in order to extrude a piece of rectangular section, such as the board S. In the embodiment of FIGS. 1a, 1b and 2 the piece being extruded is received and supported on an elongated table 60 pivotally mounted at the upper ends of supporting structure 61 by means of pivots 62 having axes paralleling the direction of extrusion in order to provide for tilting of the table between the full-line position shown in FIG. 2 and the position shown in dot-and-dash lines in FIG. 2. The table may either be tilted by hand or by power mechanism such as indicated, including arms 63 which are connected by means of piston rods 64 with operating cylinders 65, the rods 64 being associated with pistons (not shown) within the cylinders 65, by means of which the table may be rocked between the two positions indicated in FIG. 2.

When using the equipment of FIGS. 1a, 1b and 2, a board 66 is placed upon the table 60 and the piece being extruded is received upon this board 66, the board being removable and serving as a carrier element by means of which an extruded piece may be removed from the table and taken to an appropriate point for curing while additional pieces are being extruded.

For the purpose of facilitating sliding of the piece being extruded upon the board 66, a supply roll 67 of a film or web of material having a low coefficient of friction, such as waxed paper, is mounted below the end of the table 60 close to the extrusion orifice, the strip 68 being extended upwardly from the supply roll and thence over and along the board 66, in the position best seen in FIG. 2. In accordance with the preferred technique of the invention, the leading end of the waxed paper strip is started over the leading end of the board 66 at the commencement of an extrusion, and the waxed paper travels with the extrusion, thereby reducing the friction between the extruded piece and the board 66 during the extrusion operation itself. When an appropriate length has been extruded, the extruder is temporarily stopped and the paper strip and extruded piece then severed. The extrusion itself may be cut off as by means of a cutting disc indicated at 69 mounted to travel transverse the direction of extrusion. The paper may be severed in any convenient manner.

After the extrusion of a piece of predetermined length and after severing thereof in the region of the extrusion orifice, the table 60 is preferably tilted, for instance in the position indicated in dot-and-dash lines in FIG. 2 in order to facilitate bringing the edge of the extruded piece S against the edge guide or "straight edge" 70 (see FIG. 2). This arrangement provides for straightening the piece just extruded prior to removal thereof from the table 60 and delivery or carrying of the piece to the curing station.

In accordance with another feature of the preferred technique of the invention, the table 60 and also the board 66 is of length equal to more than one times the desired length of the pieces being produced. For example, the table 60 is advantageously made of length equal to at least twice that of the length of the boards to be produced in accordance with the embodiment illustrated. Indeed the table is preferably made even somewhat longer than twice the length of the pieces being made for a purpose which will be explained. Each operation of the extruder is, in this illustrative embodiment, continued for an interval sufficient to extrude a piece at least twice the length of that ultimately desired. Upon the completion of such an extrusion operation, the cut-off disc 69 is operated as already mentioned above, and after straightening of the piece by tilting the table, the table is returned to the horizontal and the straightened piece is cut to form a plurality of pieces, for instance by a second cut-off disc shown at 71 in FIG. 1b. In the embodiment as illustrated the disc 71 is located in position to cut the extrusion at about the midpoint, thereby producing two articles or boards of the desired predetermined length, both of which have previously been straightened in one operation, in the manner already described with reference to FIG. 2. With many types of pieces there is a tendency for the initial portion of the extrusion to assume an excessive amount of curvature, and for this reason with many pieces it is contemplated to employ a table which is somewhat greater in length than twice the length of a piece to be made. For instance in the making of two 8 ft. pieces, the table may desirably be of length sufficient to accommodate a 19 foot extrusion, and the cut-off saws arranged so as to cut off the leading 3 feet of the extrusion, and then to cut the remaining 16 feet at the center, in addition to effecting a cut near the extruder nozzle. The leading 3 foot piece may be returned to the pug mill for reuse.

Alternatively, an extra length table or support may be employed, and cuts may be made to separate the desired length of article by cutting only at a substantial distance, say a matter of 10 feet, from the extruder nozzle, and in this case, the "connection," so to speak, of the remaining portion of the extrusion with the extruder aids in preventing undesired or excessive curvature during the next succeeding extrusion operation.

The embodiment of the extrusion handling equipment illustrated in FIGS. 8 to 14 inclusive will be described hereinafter following description of a typical overall operation in the first described embodiment of the equipment.

As mentioned hereinabove, one of the problems encountered in attempts to extrude asbestos-cement compositions, especially by screw extrusion, is the excessive power required to effect the extrusion. According to the present invention the power required is reduced as a result of mixing the ingredients of the extrusion composition in a special manner as will be described just below in connection with a typical mixing operation.

The dry ingredients are first introduced into the crib 18 and in a typical batch a total of about 440 pounds of the dry ingredients will be introduced. Although for most purposes the presence of at least some silica is preferred, this is not necessary and in an illustrative composition usable with the present invention the dry ingredients may include only cement and asbestos, for instance 30 pounds of asbestos for each 100 pounds of cement. The mulling wheels are operated to effect mixture of the cement and asbestos in the dry condition, and this may be accomplished by running the wheels for a period of about one minute to about five minutes.

After this dry mixing, 24 parts by weight of water for each 100 parts of the mixed dry materials are added while continuing the mulling. The rate of addition of the water may be varied somewhat depending upon several factors, including the length of time of mulling or mixing following the addition of the water. In general the water should be added within a relatively short period of time. In the present illustrative example a water addition time of about 10 seconds is usable and the mulling is continued after the addition of the water but only for a very limited and carefully controlled time. With a batch containing a total of about 440 parts of dry solids, a typical mixing time following the addition of the water is of the order of 20 seconds. Variations in the water addition time and time for mixing after the water addition are referred to hereinafter. In order to terminate the mixing after this desired short interval the operator merely actuates the valve 41 in order to lift the mulling wheels out of their operating position. In this way the mulling can be terminated without awaiting the "coasting" which would occur if the power was turned off or disconnected, as a result of the dynamic inertia of the parts. Moreover, by operating in this manner the motor for operating the mulling wheels in the crib need not necessarily be turned off even between the loading or sequential batches in the crib, and in addition, if desired the operator may deliver a mixed batch to the extruder in several stages merely by opening and closing the gate 21.

We have found that this early termination of the mulling greatly facilities the extrusion action itself, thereby reducing the total power required for extrusion, while at the same time improving the quality of the extrusion. Tendency for the extrusion to crack or break up is reduced and this, in turn, facilitates the handling operation.

It is further to be noted that the technique and equipment described above for handling the extrusion also aids in avoiding cracking or breaking up of the extruded pieces, and when employing the mixing technique of the invention and also the extrusion handling technique we have found it practicable to extrude pieces of good quality and uniformity.

After a batch of material has been prepared in the crib in the manner described above, the batch is dumped into the reservoir 17 above the pug mill 8 by opening the dump gate 21 (see FIG. 6). This batch then serves as a source of supply for the pug mill 8 and the extruder itself 9 during the mixing of a subsequent batch. With the embodiment of the apparatus as shown in FIGS. 1 to 7, the extruder and pug mill may be operated intermittently providing an interval of dwell during each operation during which the cut-off disc 69 is operated, the table 60 is tilted and the cut-off disc 71 is operated.

Turning now to the embodiment shown in FIGS. 8 to 14 inclusive, it is first pointed out that the equipment here shown is an alternative arrangement of equipment for handling extruded pieces. However certain of the elements or devices used are the same as or similar to those employed in the embodiment of FIGS. 1a, 1b and 2. Therefore either the same or similar reference characters are employed for certain elements.

The extrusion nozzle of the extruder is indicated in FIGS. 8 to 14 by the numeral 13, and it is here assumed that, as in the first embodiment, the extrusion orifice is of rectangular shape so as to extrude a board-shaped piece. This piece is indicated in FIGS. 8 to 14 by the reference character S1.

Referring now in more detail to the arrangement of parts of the embodiments of FIGS. 8 to 14, it is first noted that these figures represent diagrammatic plan views of the equipment, in contrast to the illustration of the first embodiment in FIGS. 1a and 1b. Supporting or carrier boards 66a are employed, the extrusion being initially delivered onto the surface of such a board, and the board thereafter being handled and transported from station to station as will be described.

Figures 8, 9, 10:
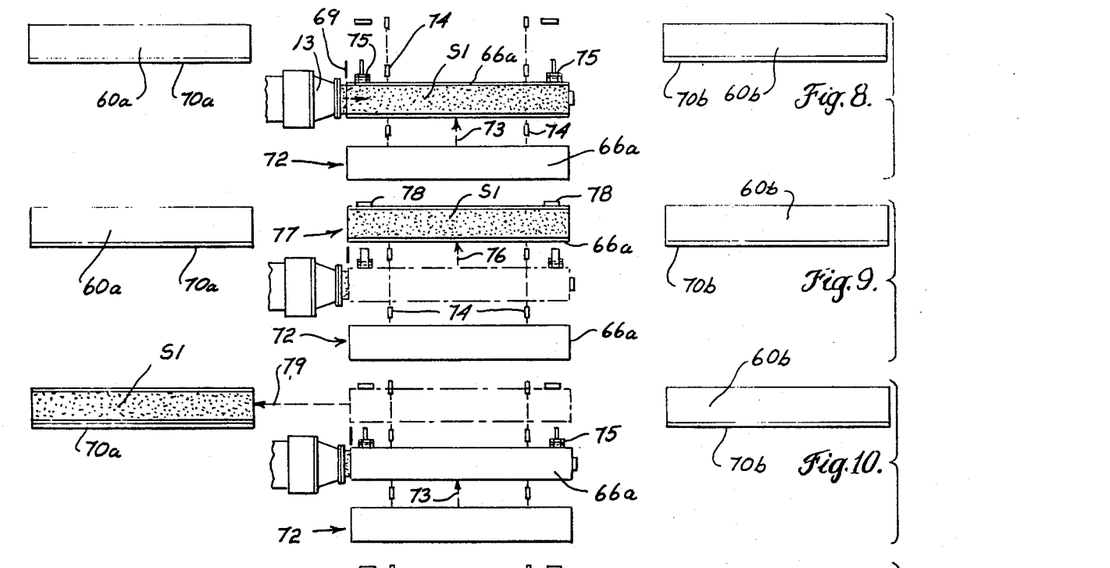
FIGS. 8 to 14 inclusive are somewhat diagrammatic views illustrating a modification of the equipment for handling and straightening successive separated lengths of the shape being extruded.

It is contemplated that a multiplicity of carrier boards be employed and these may be brought from any suitable source of supply sequentially to the station indicated by the arrow 72 in FIG. 8. From this station the carrier board is advanced in the direction indicated by the arrow 73, as by a conveyor mechanism of the roller type (a few such rollers being indicated at 74) until the board reaches a position below and in alignment with the path of extrusion, so that a piece S1 may be extruded onto the board in exactly the manner described above with reference to FIGS. 1a, 1b and 2. Although not illustrated in FIGS. 8 to 14, as before, a supply of wax paper may be employed on the surface of the carrier board to facilitate the operation. Preferably this station is defined by means of displaceable abutments 75, so that the carrier board may readily be lined up accurately with the extruder. After extrusion of the desired length of the shape being made, a piece is separated or cut off, as by means of the cutting disc 69. In the embodiment here shown the piece S1 cut off in this manner represents a piece of the length ultimately desired, and in this respect the embodiment of FIGS. 8 to 14 differs somewhat from the embodiment of FIGS. 1a, 1b and 2, wherein the piece extruded is shown as being double the length of the piece ultimately desired. It is to be understood, however, that the system of FIGS. 8 to 14 may also readily be adapted to the handling of pieces of double length, and to the subsequent severing or cutting of those pieces to the desired length, as by employment of cutting discs 71 at the tilting stations described below to which the pieces are subsequently moved. Moreover, as described above in connection with the embodiment of FIGS. 1a and 1b, the tables or supports may be of length greater than twice the length of pieces to be made, with the excess being cut off and returned to the pug mill.

In either event, whether in pieces of single or double length, after extrusion thereof and the initial cutoff by the disc 69, the positioning stops 75 are displaced and the carrier board is shifted from the position in alignment with the extruder nozzle shown in FIG. 8 in the direction indicated by the arrow 76 in FIG. 9 to the position shown in full lines in FIG. 9, this motion of the carrier again being facilitated by the rollers 74 of the conveyor. This displaced station is indicated in FIG. 9 by the numeral 77 and that station may conveniently be defined by a pair of limiting stops 78.

Thereafter the carrier board 66a with the piece S1 thereon may be shifted, either manually or by some appropriate conveyor in the direction indicated by the arrow 79 in FIG. 10 in a station to the left of that figure in which a tilt board 60a having a straightening edge guide 70a is arranged, this tilt board being mounted in the manner illustrated in FIGS. 1a, 1b and 2 so that the piece may be appropriately straightened in accordance with the technique above described.

Figure 11:
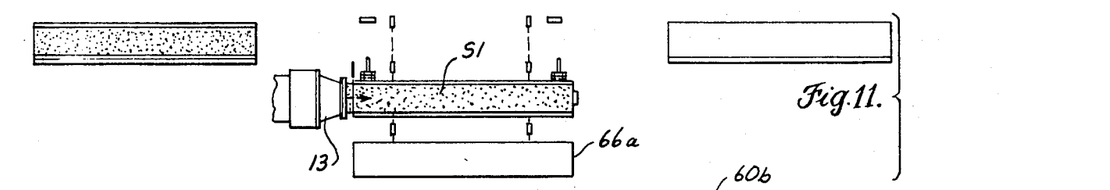
Figures 12, 13, 14:
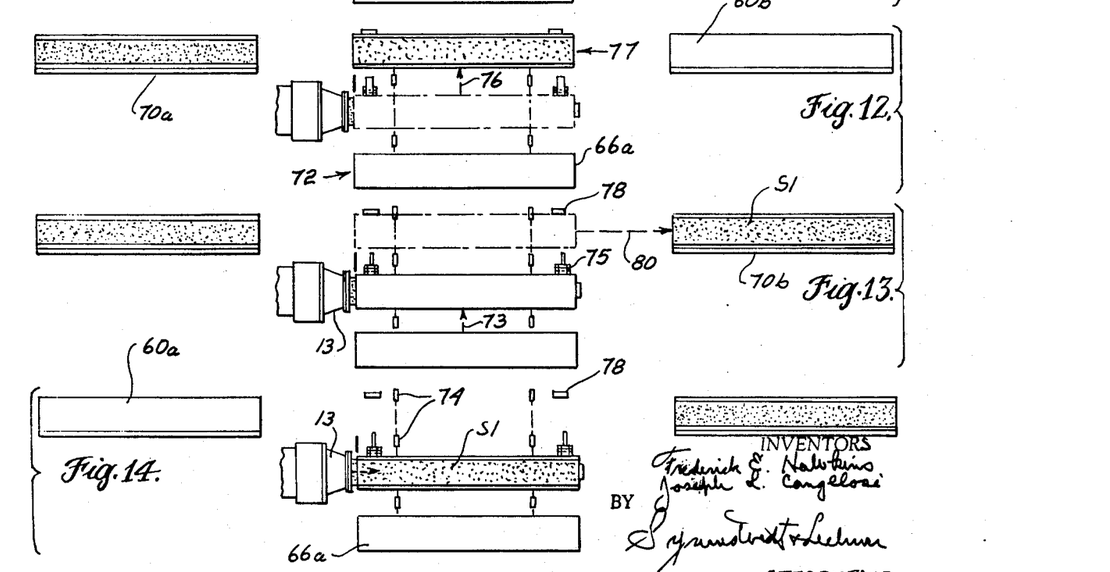

As soon the the first carrier board 66a is moved from the station 72 to the station in alignment with the extruder, another such board may be brought to the station 72 as is indicated in FIG. 9, and this board may promptly be advanced to the station in alignment with the extruder, as is indicated in FIG. 10, the displaceable stops 75 beng again positioned to properly position the board to receive the extrusion. The extrusion of the second piece then proceeds as indicated in FIG. 11, after which it is cut off and then shifted to station 77 as shown in FIG 12, and is then moved in the direction indicated by the arrow 80 in FIG. 13 to a tilting table 60b having edge guide 70b positioned to the right of the figure, instead of to the left as with the tilt table 60a above referred to.

During the extrusion of the second piece and during the time of its handling and shifting to the tilt table 70b, the piece S1 on the table 60a is being subjected to the straightening operation such as described above with special reference to FIG. 2, and when the straightening is completed the carrier board and the straightened piece are taken away to a suitable point for curing. It will be noted that in FIGS. 11, 12 and 13 the piece S1 appears in the tilt station at the left, but these diagrammatic views do not show the tilt and straightening operation which is then being performed. In any event after the piece at the left has been straightened and removed to the curing station (not shown) the tilt table 60a at the left is again available for receiving another piece, as is indicated in FIG. 14. FIG. 12 also illustrates the bringing of a new carrier board to the station 72, FIG. 13 illustrates the shift of a board from station 72 to the station in alignment with the extruder, and FIG. 14 illustrates the extrusion of the third piece S1.

During the extrusion of the third piece S1 and during its handling and shifting to the tilt table 60a at the left, the straightening operation is being effected on the piece S1 which has been delivered to the table 60b, and thus the cycle of operations is carried on at each of the two tilt table stations with alternate pieces which have been extruded.

The arrangement described above provides a handling system which may be operated with a minimum of interruption. Indeed the establishment of the stations 72 and 77 on the rolling conveyor elements 74 at opposite sides of the station in alignment with extrusion, permits such rapid feed or advancement of successive carrier boards that it is even possible to handle the pieces successively extruded, without interrupting the operation of the extruder much if at all. This is a preferred mode of operation, particularly because substantial interruption in the operation of the extruder tends to introduce non-uniformity or imperfection in the region of the discharge orifice of the extruder in consequence of the starting and stopping of the material being extruded. While continuous operation without any interruption at all would be ideal theoretically, certain short intervals of interruption may be tolerated without substantial impairment in the quality of the articles being made. Thus, the invention contemplates what might be termed substantially continuous operation of the extruder, and this will yield pieces of good quality notwithstanding short intervals of interruption.

Although only two tilt or straightening stations are illustrated in FIGS. 8 to 14 inclusive, it will be understood that more of these stations may be provided in order to provide adequate time in which to effect handling and straightening of the pieces during the substantially continuous operation of the extruder.

By operating in this substantially continuous manner, the system as a whole takes full advantage of the improvement (ease of extrusion) effected in the process as a result of the technique for mixing the ingredients of the furnish as fully described above.

Variations in the composition of the furnish or material to be extruded are usable in the method and equipment of the operation. For example, instead of employing a composition containing only cement and asbestos as in the above illustrative example, the composition may also contain other ingredients and these are desirably present during the mixing operation. Thus the composition may also contain silica. In a typical example containing silica, 48.4 parts by weight of asbestos may be employed for each 100 parts of cement along with 66.7 parts by weight of silica for each 100 parts of cement. In this case also 24 parts of water by weight based on the weight of the dry ingredients represents a suitable quantity.

As another example of a composition extrudable according to the present invention, a mixture may be prepared containing 55.7 parts by weight of asbestos for each 100 parts cement and 3.2 parts of lime by weight for each 100 parts of cement. As still another example, a composition of the type just mentioned may further include silica in which event the ingredients may include 50.6 parts by weight of asbestos, 69.7 parts by weight of silica and 4.5 parts by weight of lime for each 100 parts of cement. With these formulations 24 parts by weight of water for each 100 parts of the dry mix is a suitable quantity.

Compositions of the type referred to above may further be employed with small quantities of still other ingredients, for instance from about 0.2 to about 0.5% of an agent for further enhancing or facilitating extrudability. Examples of such materials are high molecular weight water soluble polymers of ethylene oxide, for instance the material known to the trade as Polyox WSR–301 and manufactured by Union Carbide Chemicals Company.

In addition to the specific examples referred to above, various of the ingredients may be varied in ranges such as indicated just below.

Thus asbestos fibers may be present in amounts running from about 5 parts to about 60 parts by weight for each 100 parts of cement, although a preferred range lies between about 18 to about 48 parts by weight of asbestos for each 100 parts of cement.

With regard to the silica, it is noted that this may either be omitted entirely or may be included up to amounts as high as 100 parts by weight for each 100 parts of cement, although for most purposes it is preferred not to exceed 66.7 parts by weight of silica which is the quantity yielding products of highest strength. The presence of a substantial quantity of silica is contemplated in situations where the curing is to be effected in an autoclave, i.e., in an atmosphere of steam under pressure, and this is preferred because full strength can be developed within two days of extrusion. For curing merely by permitting the extruded pieces to stand under humid atmospheric conditions, the silica is preferably excluded.

The quantity of water employed may vary from about 22 to 30 parts by weight for each 100 parts of the dry ingredients, a preferred range lying between about 23 and 28 parts by weight.

It may also be noted that the size of the batches prepared for mixture in the crib advantageously runs from about 200 pounds to about 800 pounds of the dry ingredients, preferably from about 400 to 500 pounds. The cement and asbestos together will always make up at least half of the dry ingredients.

Some variations in the times devoted to the several stages of the mixing operation is also permissible, as follows:

The dry ingredients may be mixed by mulling for a period of time running from about 1 minute to about 10 minutes, this mixing time depending somewhat upon the size of the batch and being effected merely for a sufficient time to secure thorough admixture of the dry ingredients.

As above noted the time for addition of the water is preferably kept relatively short and in any event should not exceed about 60 seconds.

The critical mixing interval following the addition of water will vary somewhat depending upon the size of the batch and also upon the length of time required to add the water. In a typical case with a batch of about 400 to 500 pounds of dry ingredients and where the water is added within about 10 seconds, the mulling operation following the addition of the water is preferably terminated at a time between about 10 to 30 seconds after the addition of the water, and preferably within an interval not exceeding about 20 seconds. On the other hand with a batch of about 400 to 500 pounds of dry ingredients, where the water addition is spread over a somewhat longer interval, for instance from about 30 seconds to about 40 seconds, then it is preferred to terminate the mixing following the water addition sooner, for instance within from about 1 second to 10 seconds following the water addition. In general this mixing or mulling operation should be terminated just as soon as the dry ingredients are all wetted with the water. We have found that continued mixing of the ingredients beyond this point has a tendency to increase the stiffness of the composition being delivered to the extruder and thereby increases the power required for and the difficulty encountered in the extrusion.

Termination of the mulling is advantageously effected by lifting the mulling wheels, but may alternatively be effected by dumping the batch through the discharge gate 21 in the bottom of the crib.

Although the method and equipment of the invention may be used with ingredients of a variety of types, the following may be noted in connection with the kinds or types of cement, asbestos and silica preferably employed.

Portland cements in general may be used, especially those known to the trade as Types I, II, III and IIIa.

Although a variety of types of asbestos fibers may be employed, any of the seven grade fibers are preferred, a typical and especially advantageous type being Canadian Quebec chrysotile slip fiber.

The silica is preferably powdered so that the bulk will pass through a 200 mesh screen. Various forms of commercially available silica are usable where this ingredient is added to the composition, although as above noted the mixture need not necessarily contain any silica.

When employing a composition of the kind referred to above in various examples, the composition prior to curing is of the consistency somewhat resembling that of putty, and yields extrusions which have smooth surfaces and which are substantially free of cracks or other imperfections.

When prepared in the manner referred to above and extruded in the manner illustrated and described, the pieces may be readily be handled by the technique described and by the equipment illustrated in FIGS. 1a, 1b and 2 without substantial damage to the pieces and the formed pieces may subsequently be either autoclaved (in the event the composition includes silica) or may be stacked, along with their supporting boards such as indicated at 66 in FIG. 2, for curing under ordinary room conditions. In the case of pieces to be autoclaved, they are preferably preliminarily cured for instance for a period of about 16 hours, at ambient atmospheric conditions (say 60° to 90° F., for example) before autoclaving. A composition of the type referred to and the equipment and method described are applicable to producing solid extrusions of a variety of shapes, and also to hollow pieces such as pipes and hollow posts.

We claim:

1. A method for making elongated asbestos-cement shapes by screw extrusion comprising mulling a dry mix comprising asbestos fibers and portland cement, adding water to the mix while still being subjected to the mulling, the water being added within about 60 seconds, continuing the mulling after the water is added and after a period of from about 1 second to about 30 seconds of said continued mulling delivering the mulled wetted mixture to a screw extruder, and effecting extrusion of the elongated shape thereby.

2. A method for preparing asbestos-cement materials for extrusion comprising dry mixing a batch of materials comprising asbestos fibers and portland cement by subjecting the materials to a mulling operation, the amount of asbestos being from 18 parts to 48 parts by weight for each 100 parts of cement and the total weight of the dry mix being from 200 to 800 pounds, after the cement and asbestos are thoroughly mixed adding from 23 parts to 28 parts by weight of water to the dry mix while continuing the mulling, the water being added within about 60 seconds, subjecting the wetted mix to continued mulling, and terminating said mulling after a period between about 1 second and 30 seconds after the addition of the water is completed.

3. A method for preparing asbestos-cement materials for extrusion comprising dry mixing a batch of materials comprising asbestos fibers and portland cement by subjecting the materials to a mulling operation, the amount of asbestos being from 5 parts to 60 parts by weight for each 100 parts of cement and the total weight of the dry mix being from 200 to 800 pounds, after an interval of from 1 minute to about 10 minutes of said mulling adding from 22 parts to 30 parts by weight of water for each 100 parts of dry mix while continuing the mulling, the water being added within a time of from 10 second to 60 seconds, subjecting the wetted mix to continued mulling, and terminating said mulling after a period between about 1 second and about 30 seconds after the addition of the water is completed.

4. A method for making elongated asbestos-cement shapes by screw extrusion comprising mixing dry asbestos and portland cement by mulling the dry ingredients in a muller crib by means of a mulling wheel therein, adding water to the mixed dry ingredients in the crib, the water being added within about 60 seconds, and continuing the mulling for a period of from about 1 second to about 30 seconds after the addition of the water, and terminating the mulling by lifting the mulling wheel away from the mixture in the crib.

5. A method for making elongated asbestos-cement shapes by screw extrusion comprising mixing dry asbestos and portland cement by mulling the dry ingredients in a muller crib by means of a mulling wheel therein, adding water to the mixed dry ingredients in the crib, the water being added within about 60 seconds, and continuing the mulling for a period of from about 1 second to about 30 seconds after the addition of the water, and terminating the mulling by dumping the batch through a discharge opening in the bottom of the muller crib.

6. A method for preparing asbestos-cement materials for extrusion comprising dry mixing a batch of materials comprising asbestos fibers and portland cement by subjecting the materials to a mulling operation, the amount of asbestos being from 18 parts to 48 parts by weight for each 100 parts of cement and the total weight of the dry mix being from 200 to 800 pounds, after the cement and asbestos are thoroughly mixed adding from 23 parts to 28 parts by weight of water to the dry mix while continuing the mulling, the addition of the water being extended over a period of time of from about 10 seconds to about 60 seconds, and subjecting the wetted mix to continued mulling following the addition of the water, but terminating said continued mulling after a period of from about 1 second to about 30 seconds after the addition of water is completed.

7. A method for making elongated asbestos-cement shapes by screw extrusion comprising dry mixing asbestos fibers and portland cement, adding water to the mix, the water being added within about 60 seconds, and subjecting the mix to mulling after the water is added and after a period of from about 1 second to about 30 seconds of said mulling delivering the mulled wetted mixture to a screw extruder, and effecting extrusion of the elongated shape thereby.

References Cited

UNITED STATES PATENTS

| | | | |
|---|---|---|---|
| 3,219,467 | 11/1965 | Redican et al. | 106—99 |
| 3,204,019 | 8/1965 | Schulze | 106—99 |
| 2,084,354 | 6/1937 | Morbelli | 106—99 |
| 2,246,537 | 6/1941 | Rembert | 106—99 |
| 2,156,308 | 5/1939 | Schuh | 106—99 |
| 1,977,158 | 10/1934 | Thurman et al. | 106—99 |
| 1,850,308 | 3/1932 | Saunders | 106—99 |
| 844,530 | 2/1907 | Von Mullenbruck | 106—99 |

FOREIGN PATENTS 538,735  8/1941  Great Britain.

TOBIAS E. LEVOW, Primary Examiner
WATSON T. SCOTT, Assistant Examiner

U.S. Cl. X.R.

162—154; 259—178